United States Patent [19]

Eyman

[11] 4,075,895

[45] Feb. 28, 1978

[54] METHOD OF OBTAINING PERIODICAL IMPACTS IN ONE DIRECTION

[75] Inventor: Krystian H. Eyman, Warsaw, Poland

[73] Assignee: Politechnika Warszawska, Warsaw, Poland

[21] Appl. No.: 627,038

[22] Filed: Oct. 30, 1975

[30] Foreign Application Priority Data

Oct. 30, 1974 Poland ................................ 175226

[51] Int. Cl.² .......................................... F16H 33/00

[52] U.S. Cl. .......................................... 74/61

[58] Field of Search .................................. 74/61

[56] References Cited

U.S. PATENT DOCUMENTS

| | | | |
|---|---|---|---|
| 3,054,463 | 9/1962 | Bodine | 74/61 |
| 3,302,470 | 2/1967 | Raniszewski | 74/61 |
| 3,486,387 | 12/1969 | Bray, Jr. | 74/61 |
| 3,564,932 | 2/1971 | LeBelle | 74/61 |

*Primary Examiner*—Samuel Scott
*Assistant Examiner*—Wesley S. Ratliff, Jr.
*Attorney, Agent, or Firm*—Haseltine, Lake & Waters

[57] ABSTRACT

The invention relates to a method of obtaining mechanical periodic oscillations shocks, used particularly in vibrators for compaction of concrete mixes and other materials.

A method according to the invention consisting in setting into rotary motion of at least two eccenters is characterized in that the eccenters are set into rotary motion with various speeds and phase displacements so that the sum of centrifugal forces in the set-up direction provides periodical oscillating motion in whose each period at least once all centrifugal forces of revolving eccenters, or the plurality of centrifugal forces coincide simultaneously with the set-up sense and operation direction, or directions parallel to each other.

2 Claims, 22 Drawing Figures

METHOD OF OBTAINING PERIODICAL IMPACTS IN ONE DIRECTION

Figure 1:
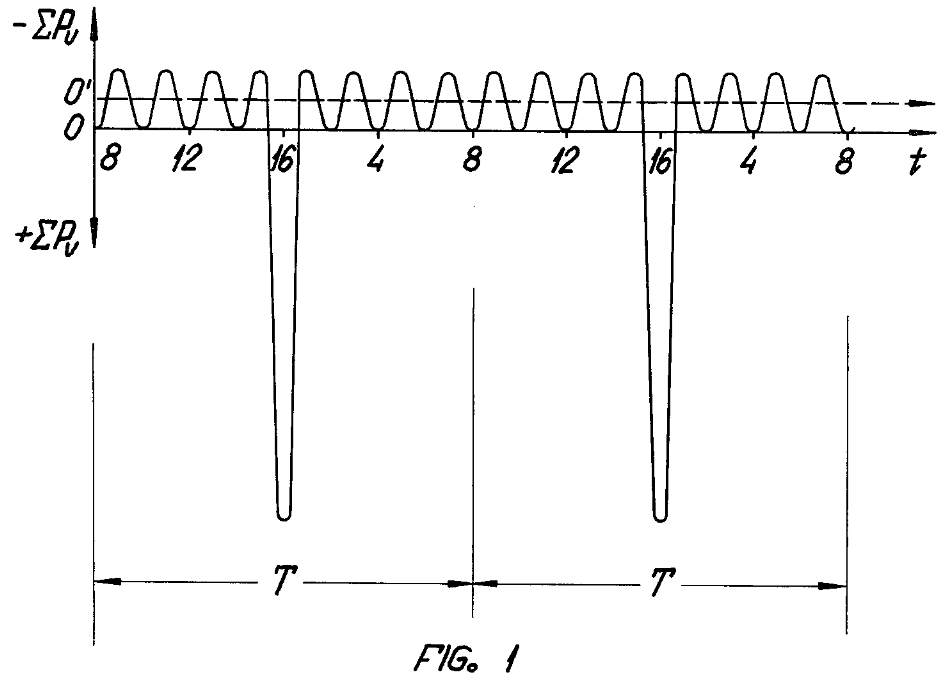

The invention relates to a method of obtaining periodic mechanical oscillations or shocks used in vibrators for the compacting of concrete mixtures and other materials and for, soil compression, compacting of road and airfield surfaces.

The method according to invention is also used in the manufacturing of various mechanical presses such as, for instance, for plastic working, in the production of vibration presses and rollers, and in the making of machines with dynamic character of work, e.g. vibration hammers. Its further application is to be found in measuring apparatus, automation control equipment, and other mechanical appliances.

A hitherto known method of generation of oscillations consists of setting an eccentric into rotary motion. The components of the centrifugal force of an eccenter in two mutually vertical directions provide simple harmonic motions.

Another known method consists of the generation of oscillations by setting two eccentrics into countercurrent rotary motions, which eccentrics are rotating with the same speeds. There are obtained then simple harmonic motions only in a set-up operation direction caused by proper components of centrifugal forces of both eccentrics, while in other directions these components annul each other.

The simple harmonic oscillations, characterized by same swings to both sides, cannot directly cause a compression of the matter. For instance, with reference to concrete mixes, they diminish only the inner friction, since the coefficient of the kinetic friction is always smaller than the static one. At the moment when the gravity force becomes greater than the inner friction force, a phenomenon of sedimentation in the mix occurs and, in consequence, its compression follows.

The purpose of the invention is to provide a method of obtaining mechanical oscillations or shocks with such a course in the time, in which the swings relative to the position of equilibrium are in both directions small and similar, except at least one strong swing in definite direction, occurring in each oscillation period.

This purpose has been achieved in the method, according to the invention, in which the periodical oscillations or shocks are obtained by setting at least two eccentrics into rotary motions with various speeds and a phase displacement so chosen that the sum of the components of centrifugal forces in a desired direction provides the oscillating periodical motion in each of whose period at least once all centrifugal forces of rotating eccentrics or their plurality coincide simultaneously with a set-up sense and operation direction or directions parallel to each other. During the rotary motion of the eccentrics, their rotary speed may be changed, due to which variations of shock forces are obtained.

In this way, a concentration of centrifugal forces in the form of a shock force in a definite time interval of the given period takes place. In the remaining time interval of the given period a partial or total cancellation of centrifugal forces of the eccentrics will proceed. The oscillations thus obtained will be harmonic oscillations of compound type.

Due to the variation of rotary speed of the eccentrics, which fact is of particular importance in plastic working, a change of the value of shock force is effected. The dependence of shock force on the rotary speed of eccentrics can also be a source of definite electrical or mechanical signals.

The eccentrics may rotate in the same direction or in various directions, which influences the course of the oscillations. Also a quantity of the centrifugal forces can vary.

Figure 2:
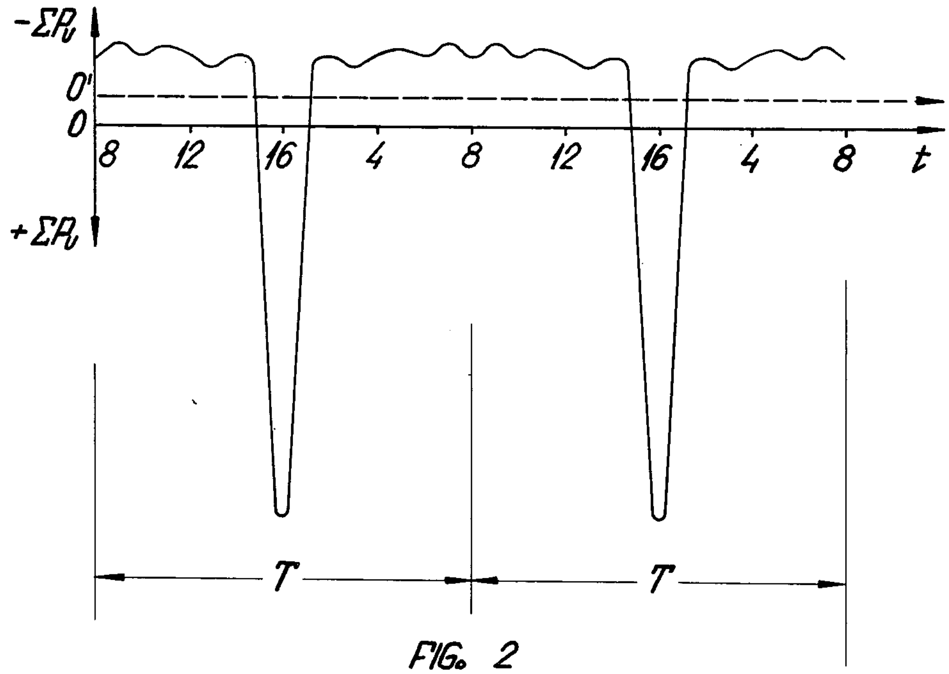

The subject of the invention is more closely explained with reference to the accompanying drawing, in which:

FIG. 1 shows a diagram of changes of the quantity of the sum of components of vertical centrifugal forces of eight identical eccentrics, each rotating with a different speed; and FIG. 2 is a diagram of changes of the quantities of the sum of components of the centrifugal forces of eight various eccentrics, each one rotating with different speeds, but identical, as in the previous example.

The variations of the quantities of the sum of components of centrifugal forces shown in FIG. 1 were obtained due to setting eight identical eccentrics into rotary speeds related each to the other as a sequence of natural numbers from 1 to 8.

The variations of the sum of components of the centrifugal forces have a periodic character. In each period T occurs one shock, in which the sum of centrifugal forces, directed downwards, reaches the maximum value. On the other hand, the sum of components of the vertical centrifugal forces, directed upwards amounts at a maximum to 12.5% of the shock force.

The diagram of variations of components of the vertical centrifugal forces, as shown in FIG. 2, has been obtained due to the rotation of eight various eccentrics with rotational speeds relative to each other as the sequence of natural numbers from 1 to 8, thereby, the masses of particular eccentrics are forming also a sequence of natural numbers, but in a reverse order relative to their rotational speeds.

The rotational speeds and phase displacements have analogus values as in the previous example.

In the diagrams according to FIG. 1 and FIG. 2, the position O of the horizontal equilibrium axis is shown as full lines, the dead weights of the oscillating appliances being not taken into account.

A proper choice of the weight of these appliances may give advantageous effects. If, for instance, the appliance has a dead weight equalling one half of the oscillating force directed upwards, the equilibrium axis will be displaced from the points O to point O'. The maximum force directed upwards will then amount to about 6.25% of the shock force directed downwards.

The invention is employed in machines appropriated for compacting of soil, road pavements and runways, as well as fo consolidation of concrete and other materials. The method according to the invention finds also its application in various power presses and other machines with dynamical character of working. It can be also employed in measuring apparatus, in control devices of the automatics, and in other mechanical arrangements.

The essence of the invention consists in change of centrifugal forces of rotating eccenters into pulse forces or impacts acting in only one direction. The values of the centrifugal forces are a function of the second power of rotational speeds of rotating eccenters. Thus, very high pulse forces can be obtained, for instance, in an order of several hundred thousands pounds, with relatively very small weight of the entire device. With sufficiently high impact frequency, for instance fifteen per second, according to the invention, the effect is obtained of tempered pressing in one direction, and that without a point of support. Variations of the rotational speeds of the eccenters cause changes of pressing forces during the pressing process, this being especially valuable for plastic forming. The dependence of the impact force on the rotational speed of eccenters can be a source of determined electrical or mechanical signals. The impacts according to the invention can be directed in any direction chosen and, as mentioned before, they do not need the point of support.

In drives, mainly the friction in ball bearings of eccenters must be overcome. Said friction is very small and thus the power necessary to overcome it is very low.

The projection of a particle rotating circularly on the vertical axis of said circle performs a rectilinear vibrating harmonic motion.

In case of use of two identical rotating eccenters, rotating in opposite senses with equal speeds, the vertical components of the centrifugal forces are summed, whereas the horizontal components are neutralized.

The variable harmonic forces generated in the described way, presented in a diagram in dependence on the time "t", have the form of a sine curve. The amplitude of said sinusoid represents the sum of the centrifugal forces, and the period thereof equals the time of the full rotation of the eccenter.

According to the invention, to obtain impacts, at least three eccenters with suitable dimensions must be used, or three pairs of eccenters, rotating in opposite senses, with different rotational speeds and different phase shifts must be used.

It is known that, if the sum of right harmonic vibrations has to give the result of periodic vibrations, the frequency of component vibrations should follow the sequence of natural numbers. Identical also should be the mutual ratio of rotational speeds of separate eccenters: that is, said rotational speeds should follow the sequence of natural numbers, for the generated impacts to be periodic ones.

In case of rotating of several eccenters with different rotational speeds, but in accordance with the specified rule, the summary period of vibrations will be equal to the time of the full rotation of the eccenter rotating with the smallest speed.

In order to generate determined impacts, before setting the eccenters in motion, all the eccenters, or at least the greater parts thereof should be set in the direction of the desired impact. Due to that, in course of rotating, a concentration of centrifugal forces occurs in the form of the desired impact in a determined time range within the given period. In the remaining time range, a neutralization of the centrifugal forces of the eccenters will occur completely or partially. Setting of all eccenters in one direction before actuating them causes that, on putting the eccenters into rotation with the necessary speeds, they assume proper phase shifts.

In FIG. 1, there is a graphic representation shown the mechanism of generating an impact directed downwards, with the use of eight eccenters rotating with different speeds, but generating identical centrifugal forces. The rotational speeds of said eccenters follow the sequence of natural numbers: $\omega$, $2\omega$, $3\omega$, $4\omega$, $5\omega$, $6\omega$, $7\omega$, $8\omega$, wherein $\omega$ denotes the angular speed of rotating eccenters, expressed in rads/s. The value of $\omega$ is selected in accordance with the technical requirements. To obtain the impact effect, only the ratio of said speeds is of importance. Similar theory relates to the choice of the values of centrifugal forces.

In FIGS. 1 and 2, differences are shown resulting from the selection of different values of centrifugal forces. In both cases, eight eccenters are applied, the rotational speeds whereof follow the sequence of natural forces from 1 to 8.

In FIG. 1, all the centrifugal forces are identical. In the case shown in FIG. 2, the centrifugal forces are identical as before but the rotational speeds, although following the sequence of natural numbers from 1 to 8, are arranged in a reverse sequence in relation to their rotational speeds. The speed "$\omega$" of the slowest rotating eccenter determines the impact frequency "T".

In diagrams of FIG. 1 and FIG. 2, the position "O" of the horizontal equilibrium axes, drawn with full lines, does not take into account the dead weight of the devices. A suitable selection of weights of said devices can give profitable effects. If, for instance, the dead weight of the device equals half of the vibrating force occurring between the impacts, then the axis of equilibrium gets shifted from the point O to the point O'. The maximum vibrating force generated between the impacts then gets reduced by a half.

I claim:

1. A method of producing periodic shocks in one direction comprising aligning at least three eccentric weights in the direction of desired shock, rotating the weights to induce centrifugal forces, and establishing different speeds of rotation of the weights in a sequence of cardinal numbers which as a result of summation of centrifugal forces, a desired shock is produced in one direction for every phase of complete revolution of the most slowly rotating eccentric weight.

2. A method as claimed in claim 1 comprising varying the speeds of rotation of the weights while maintaining the ratio thereof in said sequence of cardinal numbers.

* * * * *